United States Patent
Chen et al.

(10) Patent No.: US 7,124,398 B2
(45) Date of Patent: Oct. 17, 2006

(54) RAPID GUI REFACING OF A LEGACY APPLICATION

(75) Inventors: Lily Chen, Taipei (TW); Min-Hong Lee, Taipei County (TW); Yih-Shin Tan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 10/120,039

(22) Filed: Apr. 10, 2002

(65) Prior Publication Data

US 2003/0193521 A1    Oct. 16, 2003

(51) Int. Cl.
G06F 9/44    (2006.01)
(52) U.S. Cl. ................. 717/106; 717/147; 717/168
(58) Field of Classification Search ............ 717/1–168; 715/526–853; 345/731–780; 709/223; 707/513
See application file for complete search history.

(56) References Cited

U.S. PATENT DOCUMENTS

| | | | |
|---|---|---|---|
| 5,530,961 A | | 6/1996 | Janay et al. |
| 5,792,659 A | | 8/1998 | Janay et al. |
| 6,404,445 B1 | * | 6/2002 | Galea et al. ................. 715/853 |
| 6,771,290 B1 | * | 8/2004 | Hoyle ......................... 715/745 |
| 6,779,155 B1 | * | 8/2004 | Bahrs et al. ................. 715/526 |
| 6,782,508 B1 | * | 8/2004 | Bahrs et al. ................. 715/526 |
| 2001/0052112 A1 | * | 12/2001 | Mohan et al. ................... 717/1 |
| 2002/0083097 A1 | * | 6/2002 | Warrington ................... 707/513 |
| 2002/0122054 A1 | * | 9/2002 | Hind et al. ................... 345/731 |
| 2002/0186248 A1 | * | 12/2002 | Ramanathan et al. ....... 345/780 |
| 2003/0011632 A1 | * | 1/2003 | Gupta et al. ................. 345/747 |
| 2003/0020752 A1 | * | 1/2003 | Santiago ..................... 345/764 |
| 2003/0212987 A1 | * | 11/2003 | Demuth et al. ............. 717/130 |
| 2005/0005242 A1 | * | 1/2005 | Hoyle ......................... 715/745 |
| 2005/0172018 A1 | * | 8/2005 | Devine et al. .............. 709/223 |
| 2005/0273759 A1 | * | 12/2005 | Lucassen et al. ........... 717/105 |

FOREIGN PATENT DOCUMENTS

| | | |
|---|---|---|
| JP | 10-161976 | 6/1998 |
| WO | WO 96/41258 | 12/1996 |

OTHER PUBLICATIONS

Kamata, Yoshihiro, "Middleware for Mission Critical Client Server System," vol. 78, No. 5, 1996, p. 13-18.

* cited by examiner

*Primary Examiner*—Kakali Chaki
*Assistant Examiner*—Mark P. Francis
(74) *Attorney, Agent, or Firm*—Jerry W. Herndon, Esq.; Steven M. Greenberg, Esq.; Carey Rodriguez Greenberg & Paul LLP

(57) ABSTRACT

A rapid GUI refacing system can include one or more display grids, each display grid mapping sections in a legacy application with selected GUI elements in a refaced GUI. The system also can include one or more smart masters, each smart master specifying an arrangement of content and presentation elements in the refaced GUI. The system yet further can include a GUI transformation template generator configured to generate GUI transformation templates from individual combinations of individual ones of the display grids and individual ones of the smart masters. Finally, the system can include a GUI refacing service configured both to select individual matching ones of the generated GUI transformation templates, and also to transform content in the sections in the legacy application into the refaced GUI using the mapped GUI elements according to transformation instructions contained in the selected individual matching ones of the generated GUI transformation templates.

5 Claims, 8 Drawing Sheets

RAPID GUI REFACING OF A LEGACY APPLICATION

BACKGROUND OF THE INVENTION

1. Statement of the Technical Field

The present invention relates to the customization of a host application graphical user interface (GUI) and more particularly to the rapid and efficient GUI refacing of a legacy application.

2. Description of the Related Art

Customizing the GUI of a legacy application has proven a tedious task. In most cases, an integrated development environment (IDE) or design studio is required to effectively generate a GUI based upon the original display screens of the legacy application. During the refacing process, each screen of the legacy application must be marked up individually. Even where legacy application screens can be structured into a handful of repeatable layout patterns, the GUI must be redrawn from scratch, screen by screen. Hence, the conventional refacing of a legacy application can be time consuming and can result in interface inconsistencies. Also, the process of conventionally refacing the GUI of a legacy application can be inflexible thus hindering the ability both to extend the GUI with additional functionality and also to migrate the GUI to other platforms.

In an effort to overcome the clear deficiencies of conventional legacy application GUI refacing, some have developed template based customization and component extraction techniques in an effort to improve the screen marking experience. Still, template based customization and component extraction techniques remain tied to screen flows and require screen level drawing. An experienced legacy application IT specialist or architect has not a rapid and efficient method for dynamically and systematically generating GUIs from multiple fixed patterns.

Yet others have proposed template formats configured to manually specify multiple default GUI styles. Examples include the use of pre-scripted extensible stylesheet (XSL) transformations designed to process the presentation layer for legacy hosts. Nevertheless, the stylesheet creation process itself has proven to be a time consuming process. Also, when using XSL transformations, presentation styles, screen patterns, and the meaning of the underlying content are not automatically associated. While global customization can be applied to partially overcome this problem by pre-configuring global changes for all screens, global customization remains merely a partial solution applying only to trivial patterns.

In view of newer technologies such as Java™ server pages (JSP), the extensible markup language (XML) and XSLT, meta-data has become an obvious template technique useful in describing GUI transformations for legacy application screen data. In particular, newer technologies such as JSP, XML and XSLT can be effective in producing transformations for the individual screens of a legacy application. Notwithstanding, these newer technologies alone remain insufficient when systematically transforming a large number of display screens of a legacy application. Specifically, even with the newer transformation technologies, an application designer still must learn the template formats including syntax and semantics, match screen patterns manually, create individual GUI elements, associate the legacy application screen contents with the individual GUI elements, and enforce the look-and-feel consistency of each screen.

Importantly, the template format both old and new itself is not comprehensive enough to be extensible. Even if both the GUI element coordinates and GUI description are included as attributes in a template, the rules for constructing the GUI from the legacy application display screen region can be quite complex and the interpretation of the attributes seldom can be reflected by the template. In consequence, code modifications of the base processing can be required in a purely template driven technique. Therefore, the mere provision of an external template format is not sufficient for systematic GUI transformations of the display screens of a legacy application.

SUMMARY OF THE INVENTION

The present invention is a system and method for rapidly and efficiently refacing the GUI of a legacy application. In accordance with the present invention, a systematic method can be provided in which a finite set of GUI transformation rules can be configured to process all GUI screen displays of the legacy application. The GUI transformation rules also can include both origin dependent and origin independent customized GUI elements and transformation logic. Notably, the method of the invention can be performed independently of a specific IDE or studio such that the GUI transformation rules can be configured from general client software, for example one or more content browser forms.

The system and method of the invention can permit the easy extension of the GUI transformation rules both to include advanced customizations which combine multiple GUI displays in macro format, and also to perform unique modifications to specific display screens of the legacy application. Moreover, the configured GUI transformation rules can be preserved in a standard template format such that configured GUI transformation rules can be processed using an existing engine, for example JSP or XSLT. In consequence, the standard templates can be exported to conventional front-end presentation authoring tools where further enhancement will be required.

In accordance with the present invention, a display template architecture can be provided which can include both a static section for a main body, for instance an HTML page, and multiple embedded dynamic data sections. Each section can be mapped to a region in the original display screen of the legacy application. The map can associate the original display content in the region with a new display GUI element to transform at the location of the rectangular section. In that regard, each original region can be further provided with a list of content extraction methods that include content patterns, macros, custom methods, and content substitutions, to extract content from the region.

Each extraction method can be further associated with a list of GUI elements for use in the GUI refacement. For example, origin content extracted through a screen display menu pattern can be transformed into one of a drop down list, hyper link list, or option list GUI element. Importantly, an interface can be provided through which application developers can generate the templates necessary to undertake the above-described transformations. Within the interface, layout grids can be provided with which each section of the target visual display can be configured with prepared extraction methods and target GUI elements. Furthermore, the templates can be associated with families of original GUI display windows.

Standard template formats, for example templates defined within JSP files, can be used to specify the templates. In consequence, the templates generated within the interface of the present invention can be imported into conventional authoring tools for output enhancements. Moreover, inasmuch as the templates are defined using standard template formats, the templates can be processed within conventional transformation engines such as well-known JSP processors, in order to format output streams.

A template matching subprocess can be provided with which the origin contents of a legacy application can be matched with the generated templates during the transformation process. An output transformation subprocess can be particularly provided to transform the original screen display contents of the legacy application to new GUI display styles according to selected ones of the generated templates. Similarly, an input transformation subprocess can be provided to convert input fields from the transformed new GUI display style to the original format understood by the legacy application. Significantly, the method of the invention can be applied, not only to GUI transformations, but to data transformations as well. In that regard, origin data can be masked by grids and transformed to target data in a fashion similar to that of display elements in accordance with the present invention.

A method for performing rapid refacing of a legacy application can include the steps of matching display elements in the display screen of a legacy application with GUI transformation templates configured to transform the display elements into GUI elements in a target visual display. Subsequently, transformations can be performed which are specified in the matching GUI transformation templates. The transformations can produce a refaced GUI for the legacy application. The method can further include the steps of intercepting data submitted through the refaced GUI intended for processing in the legacy application; transforming the intercepted data into a native format which can be processed in the legacy application; and, forwarding the transformed data to the legacy application. Notably, the matching step can include intercepting display screen contents intended for display in the target visual display; characterizing the intercepted display screen contents according to identifiable regions of the intercepted display screen contents; and, matching the characterization to a specified display area in a specific one of the GUI transformation templates.

Importantly, the method can include the steps of configuring a template generation interface for specifying both regions of a legacy application display screen and also corresponding display elements within the specified regions; further configuring the template generation interface for associating the specified regions and corresponding display elements with GUI elements to be included in the refaced GUI; and, generating the GUI transformation templates according to regions of the legacy application display screen, corresponding display elements and associated GUI elements, each specified through the template generation interface. In that regard, the generating step can include the steps of identifying a tag definition for each display element in the display screen, each the tag definition mapping the display element to a GUI element for use in the target visual display; and, writing a JSP file with the identified tag definitions.

A rapid GUI refacing system can include one or more display grids, each display grid mapping sections in a legacy application with selected GUI elements in a refaced GUI. The system also can include one or more smart masters, each smart master specifying an arrangement of content and presentation elements in the refaced GUI. The system yet further can include a GUI transformation template generator configured to generate GUI transformation templates from individual combinations of individual ones of the display grids and individual ones of the smart masters. Finally, the system can include a GUI refacing service configured both to select individual matching ones of the generated GUI transformation templates, and also to transform content in the sections in the legacy application into the refaced GUI using the mapped GUI elements according to transformation instructions contained in the selected individual matching ones of the generated GUI transformation templates.

Notably, the generated GUI transformation templates can include JSPs containing the transformation instructions. Moreover, the system can include a third party extension interface through which at least one of a third party GUI element, extraction method, content substitution, and input transformation interface can be integrated into the GUI refacing service in order to provide extensibility both to mapping the selected GUI elements to the sections, and also to transforming the sections of the legacy application into the refaced GUI. It is also to be noted that the sections of the legacy application can include one of or both display sections and data sections.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a method and system for rapidly refacing the GUI of a legacy application. The system and method can systematically perform rule based refacing of legacy application display screens without requiring the individual and manual redrawing of each display screen. Rather, the system and method can provide a mechanism through which application developers can define GUI customization patterns and settings merely by selecting predefined GUI refacing rules. Notably, the system and method of the present invention relies neither upon an IDE nor upon a development studio. Only simple configuration GUI utilities such as html forms or a text editors can suffice.

In accordance with the present invention, layout grids can be used to map legacy application display screen regions to GUI elements such that customizations are provided through convenient option selections. Literally, thousands of legacy application display screens can be rapidly customized in this way simply by grouping the display screens into families of display screens having similar patterns. In consequence, the method can be extensible to include customized and macro host screen extraction, customized GUI elements, and customized rendering. Furthermore, the present invention can support both request/response (macro) and session oriented legacy application interactions.

It is important to point out that application of the rapid GUI refacing system and method of the present invention is not merely limited to transforming the display screens of legacy applications. In fact, the present invention can be applied equally as well with great effectiveness for other types of applications including Windows® clients for client-sever applications. Moreover, data transformations, in addition to GUI refacing, fall within the purview and scope of the present invention.

Figure 1:
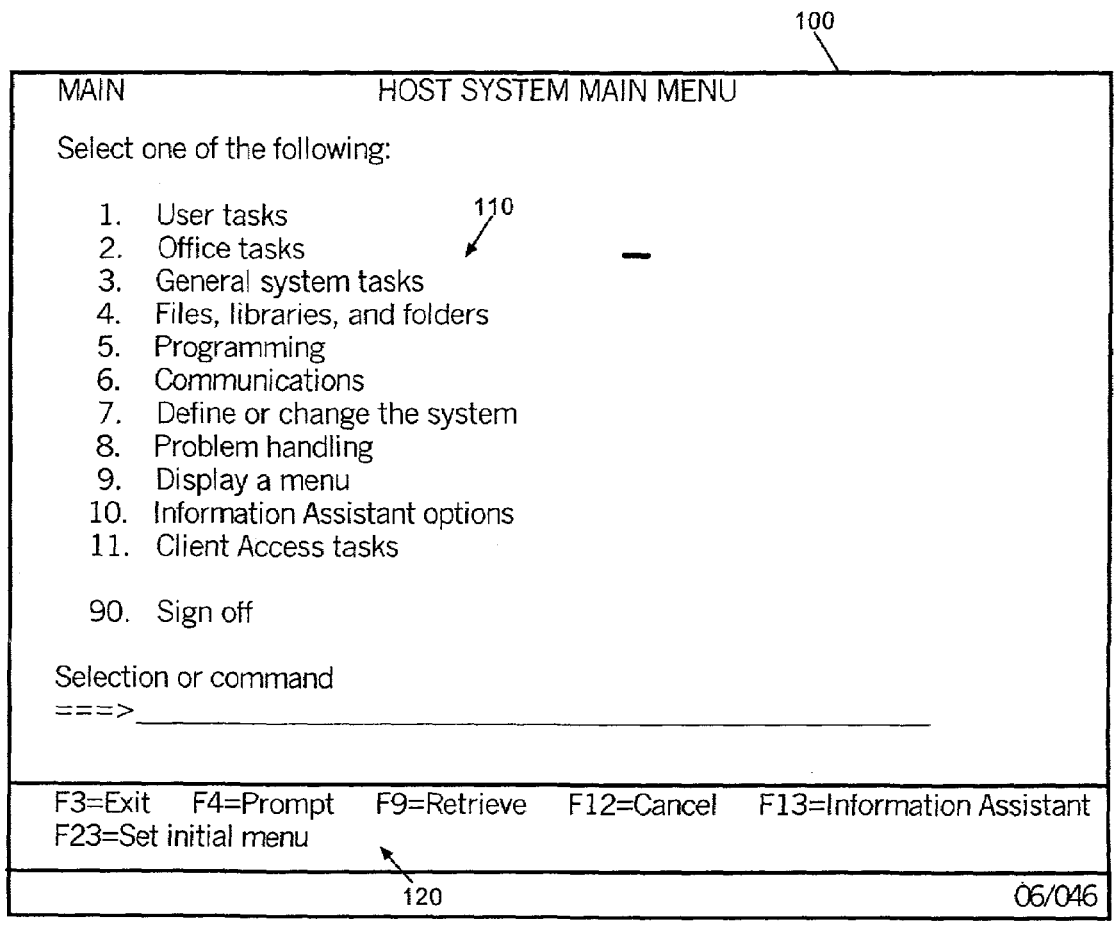
FIG. 1 is an image of an exemplary legacy application display screen.
Figure 2:
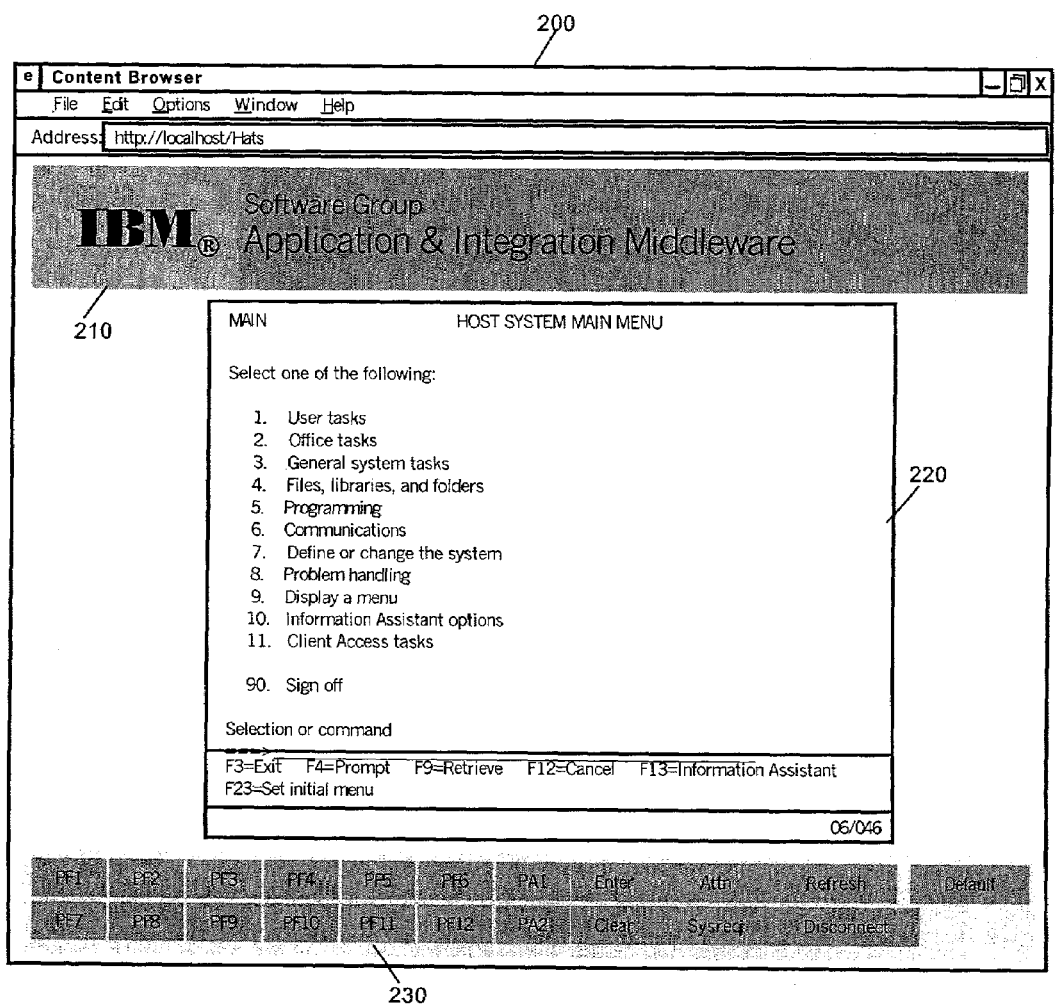
FIG. 2 is an image of an exemplary refaced GUI (plain HTML) for the legacy application display screen of FIG. 1.
Figure 3:
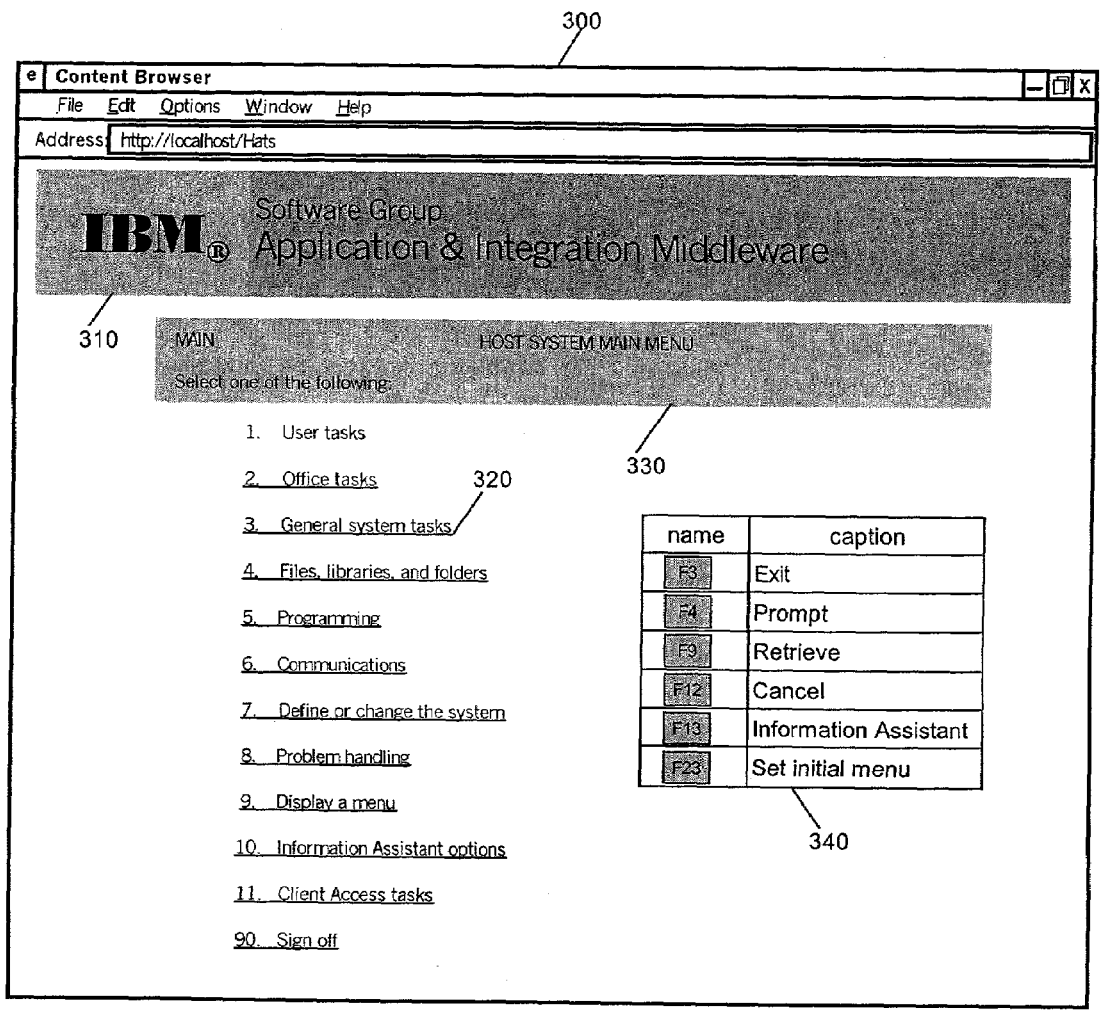
FIG. 3 is an image of another exemplary refaced GUI (hyperlinks and button pad) for the legacy application display screen of FIG. 1.
Figure 4:
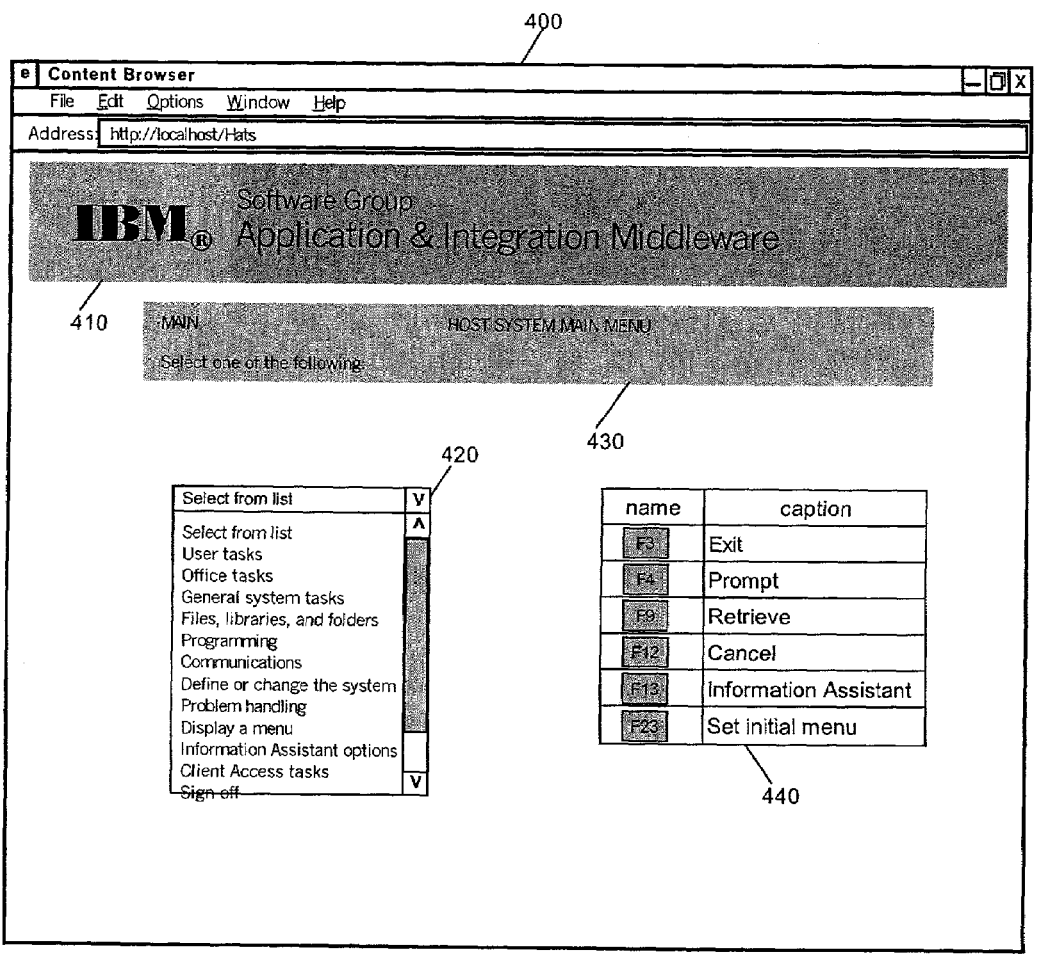
FIG. 4 is an image of yet another exemplary refaced GUI (dropdown list and button pad) for the legacy application display screen of FIG. 1.

FIGS. 1 through 4, taken together, can be helpful in illustrating the GUI refacing of a legacy application screen in accordance with the present invention. In particular, FIG. 1 is an image of an exemplary legacy application display screen, while FIGS. 2, 3 and 4 are images of exemplary refaced GUIs for the legacy application display screen of FIG. 1. For example, FIG. 2 illustrates a plain HTML rendition of the display screen of the legacy application of FIG. 1, FIG. 3 illustrates a hyperlink and button pad rendition of the display screen of the legacy application of FIG. 1, and FIG. 4 illustrates a dropdown list and button pad rendition of the display screen of the legacy application of FIG. 1.

Returning now to FIG. 1, an exemplary legacy application 100 having a screen display of eighty columns and twenty-four rows can be refaced in accordance with the present invention. While one skilled in the art would recognize the exemplary legacy application 100 as a mid-range computing application, the invention is not so limited and any legacy application can suffice including not only mainframe applications, but also Windows based client-server applications and the like. In the example of FIG. 1, the exemplary legacy application 100 can include a textual list of menu items 110 in addition to a listing of function keys 120.

In FIG. 2, the exemplary legacy application of FIG. 1 has been rapidly refaced for display in a content browser 200, for example a Web browser. The refaced GUI can include not only a plain HTML representation 220 of the exemplary legacy application 100, but also a pictorial banner 210 can be added as can a button bar 230 at the bottom of the display area. In particular, the button bar 230 can include buttons representing those keyboard keys that would be otherwise available were an end-user operating the mid-range application directly rather than through a content browser 200.

In FIG. 3, by comparison, the exemplary legacy application 100 of FIG. 1 once again has been rapidly refaced for display in a content browser 300, for example a Web browser. The refaced GUI can include a static text display region 330 in which static text portions of the exemplary legacy application 100 can be displayed. Notably, the menu items 110 of FIG. 1 can be transformed into a set of activatable hyperlinks 320. Also, the function keys 120 of FIG. 1 can be transformed into a button bar 340. Finally, a pictorial banner 310 can be added.

In FIG. 4, the exemplary legacy application 100 of FIG. 1 yet again has been rapidly refaced for display in a content browser 400, for example a Web browser. As in the refaced GUI of FIG. 3, the refaced GUI of FIG. 4 can include a static text display region 430 in which static text portions of the exemplary legacy application 100 can be displayed. Unlike the hyperlinks of FIG. 3, however, in FIG. 4 the menu items 110 of FIG. 1 can be transformed into a drop down list 420. Like FIG. 3, however, the function keys 120 of FIG. 1 can be transformed into a button bar 440 and a pictorial banner 410 can be added. Importantly, the invention is not so limited as to the few exemplary transformations illustrated in FIGS. 2 through 4. Rather, the limited transformations shown are to be considered as being merely representative of the many possible transformations which can be applied in accordance with the present invention.

Figure 5:
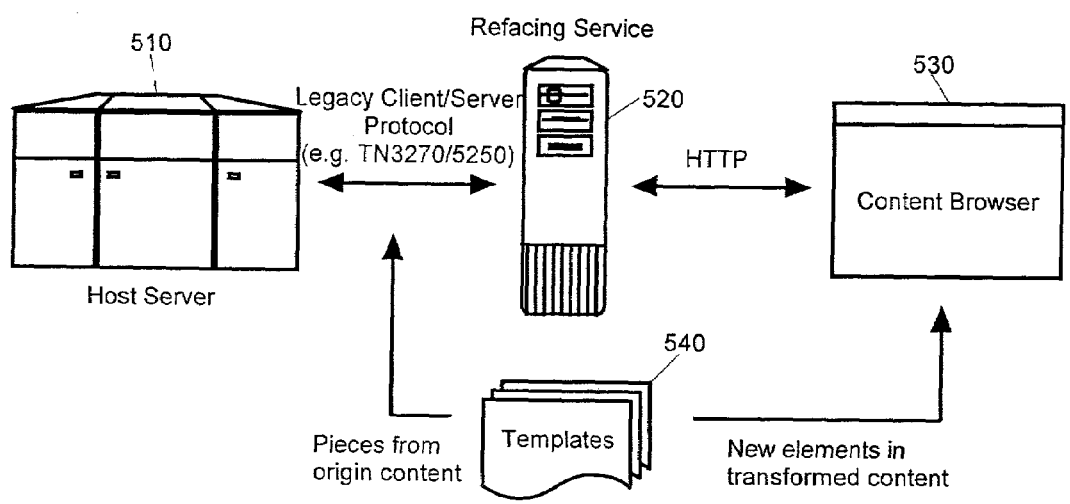
FIG. 5 is a pictorial illustration of a system configured to provide rapid GUI refacing for legacy applications in accordance with the inventive arrangements.

FIG. 5 is a pictorial illustration of a system configured to provide rapid GUI refacing for legacy applications in accordance with the inventive arrangements. In accordance with the present invention, the system can include a refacing service 520 which can transform the content of a legacy application within a host server 510 into content suitable for display in a content browser 530, for example a Web browser, or other such markup language interpreter. Importantly, while the pictorial illustration of FIG. 5 specifically references both mid-range and mainframe communication protocols, as the illustration references Web based protocols, the invention is not so limited to the particular embodiment depicted therein. Rather, as the invention relates particularly to the rapid GUI refacing of a legacy application and the transformation of legacy application data, any such legacy application system and corresponding GUI display browser can suffice.

Figure 6:
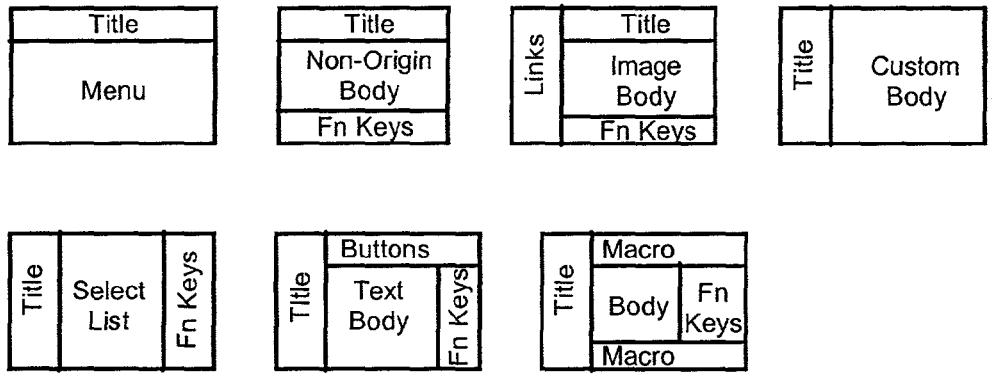
FIG. 6 is a high level flow illustration of a process for producing a template for use in rapidly racing the GUI of a legacy application in the system of FIG. 5.
Figure 6:
Figure 6:
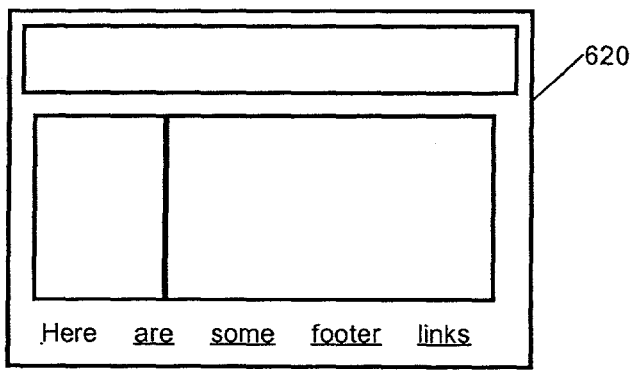
Figure 6:
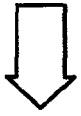
Figure 6:
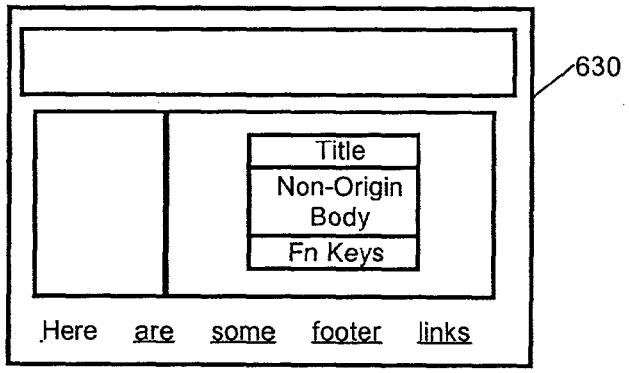

As one skilled in the art will recognize, the refacing service can undertake GUI refacement and data transformation through the extensive use of templates 540. Specifically, in the present invention, templates 540 can be generated using rapid drag-and-drop techniques to suitably handle any number of legacy application display screen patterns likely to be encountered in any one legacy application. In that regard, FIG. 6 is a high level flow illustration of a process for producing a template for use in rapidly racing the GUI of a legacy application in the system of FIG. 5. The template architecture shown in FIG. 6 can include layout grids 610, one or more smart masters 620, and mapping relationships (not shown) for sections of a grid between the content of the legacy application and the target content of the content browser. When combined, the layout grids 610 and the smart masters 620 can produce a template 630 for refacing a display screen of a legacy application which matches the specified pattern.

A template generation interface can be provided to produce the template 630. Though any suitable interface can suffice, in a preferred aspect of the invention, an interface can be provided in which a region of the legacy application display screen can be specified in order to locate the pertinent origin content. The interface also can include a target GUI element selection such as a drop-down box (pull-down list), a button bar, a static text field, a text input field, a set of radio buttons, a set of hyperlinks, etc. Other presentation issues can be addressed in the interface, as well, including the dimensioning of the layout region and the type of legacy application component specified in the region of the legacy application display screen.

Figure 7:
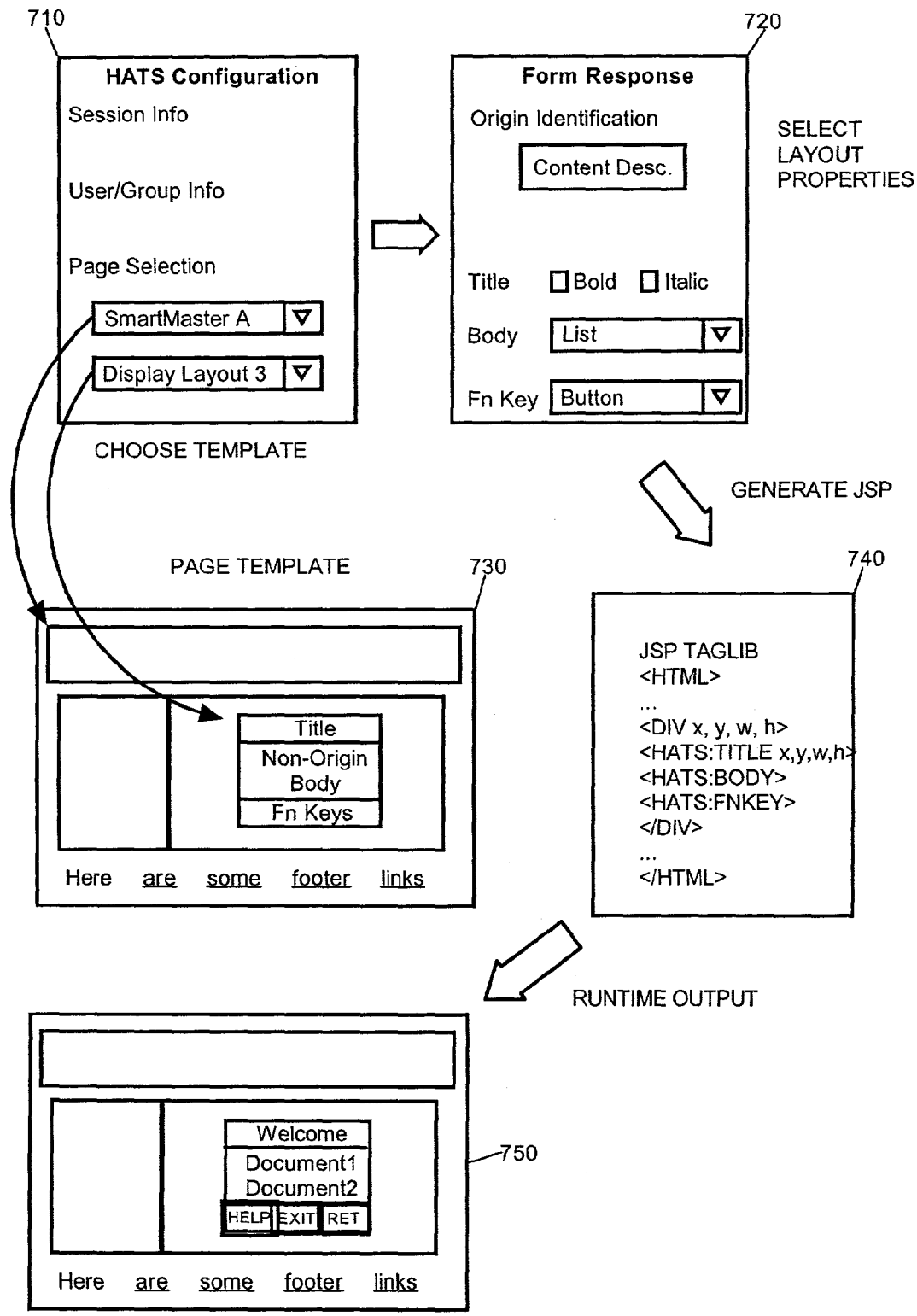
FIG. 7 is another high level flow illustration of a process for producing a template for use in rapidly refacing the GUI of a legacy application in the system of FIG. 5; and, FIG. 8 is a schematic illustration of a the refacing service of FIG. 5.

FIG. 7 is another high level flow illustration of a process for producing a template for use in rapidly refacing the GUI of a legacy application in the system of FIG. 5. In block 710 of the template generation process shown in FIG. 7, a smart master and layout grid can be selected in order to configure the desired transformation effect for a family of legacy application content that fit the specified description. In particular, as shown in block 730, the selected smart master can relate directly to the overall display arrangement of the refaced GUI, while the display layout can map the legacy application content to a specific arrangement of GUI elements in the refaced GUI.

Once a display layout has been selected in block 710, in block 720 display layout properties can be selected according to the selected display layout of block 710. In the example shown in FIG. 7, attributes for each GUI element in the selected display layout can be selected. For instance, a drop-down list box can be selected as the particular GUI element used to display the body of the legacy application display screen. Similarly, a button bar can be selected as the transformative GUI element for the bank of function keys in the legacy application display screen.

Once the layout properties have been selected in block 720, in block 740 the resulting template can be written to a script, for instance a JSP file. The JSP file can become the basis of transformation during the operation of the refacing service 520 of FIG. 5. Specifically, as display screens produced by the host server 510 are matched to the produced template 740, the output transformations specified by the transformations can be applied to the matching display screens in order to produce a refaced GUI 750 as shown in FIG. 7.

Appendix A includes a listing of a sample JSP file which specifies a template for transforming legacy application content into a refaced GUI. In particular, the JSP file of Appendix A illustrates a generated template using a border layout. While "Body 1" of the template transforms the static label of row 1 of the display screen of the legacy application into a label component consuming 100% of the width of the refaced GUI, but merely 20% of the height, "Body 2" of the template transforms the selection list of the legacy application into a hyperlink component consuming half of the height of the refaced GUI and 60% of the width of the refaced GUI. "Body 3" of the template transforms the function keys of row 16 of the legacy application into a button bar consuming half of the height of the refaced GUI and 60% of the width of the refaced GUI. Finally, "Body 4" of the template transforms the command line portion of the legacy application at row 16 into a text input field consuming 100% of the width of the refaced GUI, but only 20% of the height.

As will be apparent to one skilled in the art, the sample JSP file of Appendix A includes a "HATS:Component" JSP custom tag. Appendix B lists the tag definition for the relationship map for legacy application content as used in the JSP file of Appendix A. Specifically, the tag definition of Appendix B can occupy a rendering position in the template of Appendix A. The position in the example can be plotted using the <TABLE>, <TR>, and <TD> tags as is well-known in the study of HTML. The tag definition ties together extraction types with their implementation classes, and rendering styles with their implementation classes.

Notably, modification or extension of the tag definition can be performed merely by including or replacing the portions of the same interfaces of provided extraction method and GUI elements. Examples of provided extraction methods (patterns) for legacy application content can include "GreenScreen", "CommandLine", "FunctionKey", "Field", "Text", "SelectionList", "Menu", "FieldTable", "VisualTable", and "Paragraph". Corresponding Examples of content stylesheet (CSS) HTML constructs style elements can include GreenScreen Display, Button, Link, OptionList, DropDownList, Table, TextInput, Input, Label, Image, ImageLink, and ButtonTable.

Figure 8:
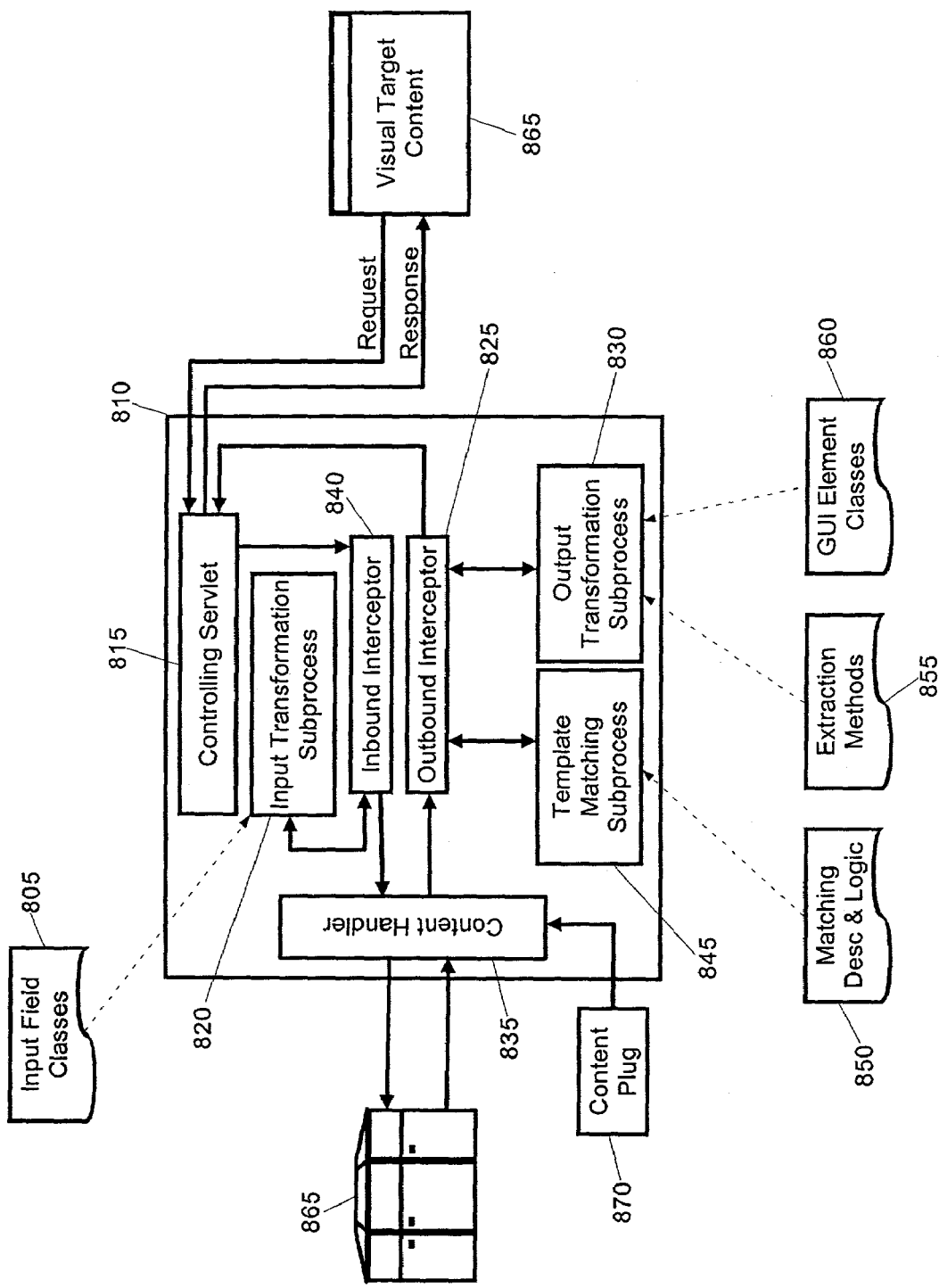

Appendix C lists a sample subset of tags in a template to illustrate transformations and substitutions of multiple contents. Tags A, B, and C extract contents from the same origin, while Tag D substitutes the origin content with a different content source. Still, all transformations occur within the same execution environment. Therefore, multiple content origins can be accomplished. As will be apparent from the listing in Appendix C, tag definitions can be generalized further with an origin attribute to allow more flexibility in each layout grid. The tags can be moved about outside of their respective grids using an authoring tool. Notably, Tag E illustrates the notion that the tags can coexist with other custom tag definitions as well. FIG. 8 is a schematic illustration of a refacing service 810, for example the refacing service 520 of FIG. 5. The refacing service 810 can include a controlling servlet 815, a content handler 835, a template matching subprocess 845 and an output transformation subprocess 830. The content handler 835 can recognize content types specified by the content plugs 870. Simply stated, each content plug 870 specifies a particular type of content which might be encountered in the display screens of a legacy application in the host server 865. When content is received in the content handler 835, the content handler 835 can consult with the content plug 870 to determine whether the received content matches any of the specified types of content.

Once the particular type of received content has been recognized by the content handler 835, a template matching subprocess 845 can locate a matching template suitable for performing the GUI transformation of the content for display in the visual target 875. Once identified, the output transformation subprocess 830 can apply the selected template to produce the GUI transformation it supports. Notably, each of the subprocesses 845, 830 can be controlled by interceptors 825, 840. The interceptors 825, 840 work with the controlling servlet 815 and content handler 835 to intercept and transform content between the host server 865 and the visual target 875.

Specifically, the outbound interceptor 825 can uses the template matching subprocess 845 to select a template for received content. Subsequently, the output transformation subprocess 830 can process the template to perform the GUI refacement. Additionally, the mapping relationships embedded in the template trigger the execution of transformation intelligence represented both in the extraction methods 855 and GUI element classes 860.

As the refacing service 810 can provide round-trip transformations, once the content from the host server 865 has been transformed in the visual target 875, it can be expected that user interactions with the visual target 875 will require the forwarding of response data back to the host server 865. In this regard, the inbound interceptor 840 can use the input transformation subprocess 820 to convert input fields from the visual target 875 back into an origin format suitable for processing in the host server 865. In particular, the input transformation subprocess 820 can rely upon input field classes 805 to assist in the transformation process.

Notably, during the response process in the input transformation subprocess 820, input fields can be embedded in an generated output response file. Specifically, the value of the input fields can be automatically returned to the controlling servlet 815, processed by the inbound interceptor 840 using the input transformation subprocess 820. A list of system defined input fields can provided according to the input field classes 805. Thus, the response mechanism of the GUI refacing service 810 can provide plug-in capability for end user and third party implementations to capture non-system defined input field values to prepare for the next response cycle.

In sum, the GUI refacing and transformation system of the present invention can provide a systematic approach using layout grids to map original content regions such as legacy application display screen fragments to target contents such as GUI elements. In particular, the transformation or GUI refacing can be accomplished rapidly and efficiently by selecting provided options. An implementation of the method and system of the present invention can be realized in a centralized fashion in one computer system, or in a distributed fashion where different elements are spread across several interconnected computer systems.

Any kind of computer system, or other apparatus adapted for carrying out the methods described herein, is suited to perform the functions described herein. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

APPENDIX B

```
<HATS:Component
    type='extraction component type'
    class='default or custom extraction class name'
    row='row number of origin region in legacy application'
    col='column number of origin region in legacy application'
    erow='end row number of origin region in legacy application'
    ecol='end column number of origin region in legacy application'
    labelString='label of extraction component'
    style='target rendering style'
    styleclass='default or rendering style class name'
    customToken='any string' />
```

APPENDIX C

```
A. Macro Extract
<HATS:Component
    type='Macro'
    labelString='myMacroExtraction'
    style='myCatalogTable'
    stylecass='myCatalogTable.class'
/>
B. Custom Extract
<HATS:Component
    type='Custom'
    class='myCustomExtraction.class'
    row='1'
    col='40'
    erow='12'
    ecol='80'
    style='ImageLink'
    stylecass='myImageLink.class'
    customToken='file path to my image file'
/>
C. Pattern Extract
<HATS:Component
    type='Menu'
    row='1'
    col='1'
    erow='24'
    ecol='80'
```

APPENDIX A

```
<HATS:Template>
<script language="JavaScript" src="JSP/Include/Ixgwfunctions.js"></script>
<form name="myform" method="POST" action="Hats">
<table border="0" width="100%">
<tr><td width="100%" height="20%" colspan="3" align='center'>
<HATS:Component style='Label' type='Text' row='1' col='1' erow='2' ecol='80' labelString='/>
<!--Body1-->
</td></tr>
<tr><td width="50%" height="60%" align='center'>
<HATS:Component style='Link' type='SelectionList' row='1' col='1' erow='24' ecol='80' labelString='/>
<!--Body2-->
</td>
<td width="50%" height="60%" align='center'>
<HATS:Component style='ButtonTable' type='FunctionKey' row='16' col='1' erow='24' ecol='80' labelString='/>
<!--Body3-->
</td></tr>
<tr><td width="100%" height="20%" colspan="3" align='center'>
<HATS:Component style='TextInput' type='CommandLine' row='16' col='1' erow='24' ecol='80' labelString='/>
<!--Body4--></td></tr>
</table>
</form>
</HATS:Template>
```

APPENDIX C-continued

```
        style='RadioButtons'
    />
D. Substitution
    <HATS:Component
        type='Substitution'
        class='mySubstitutingContent.class'
        labelString='mySubstitutingContent'
        style='myStyle'
        stylecass='myStyle.class'
        customToken='parameter string'
    />
E. Mixing with other custom tags
    <customNS:customTag
        attribute1='string'
        ...
        attributen='string'
    />
```

We claim:

1. A computer-implemented rapid graphical user interface (GUI) refacing system, comprising:
 a plurality of display grids, each display grid mapping sections in a legacy application with selected GUI elements in a refaced GUI;
 a plurality of smart masters, each smart master specifying an arrangement of content and presentation elements in said refaced GUI;
 a GUI transformation template generator configured to generate GUI transformation templates from individual combinations of individual ones of said display grids and individual ones of said smart masters; and
 a GUI refacing service configured both to select individual matching ones of said generated GUI transformation templates, and also to transform content in said sections in said legacy application into said refaced GUI using said mapped GUI elements according to transformation instructions contained in said selected individual matching ones of said generated GUI transformation templates.

2. The system of claim 1, wherein said generated GUI transformation templates comprise platform-neutral server pages comprising transformation instructions.

3. The system of claim 1, further comprising a third party extension interface through which at least one of a third party GUI element, extraction method, content substitution, and input transformation interface can be integrated into said GUI refacing service in order to provide extensibility both to mapping said selected GUI elements to said sections, and also to transforming said sections of said legacy application into said refaced GUI.

4. The system of claim 1, wherein said sections comprise display sections.

5. The system of claim 1, wherein said sections comprise data sections.

* * * * *